May 15, 1934.    J. L. PERKINS ET AL    1,959,303
DOUGH SLICING APPARATUS
Filed April 24, 1933    4 Sheets-Sheet 2
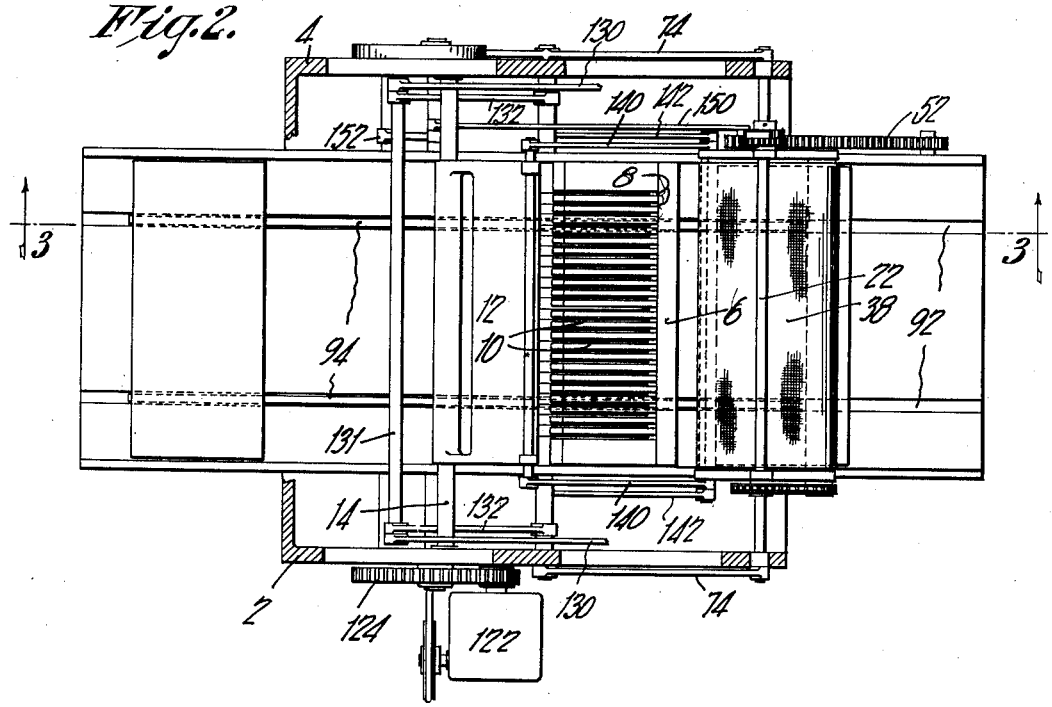
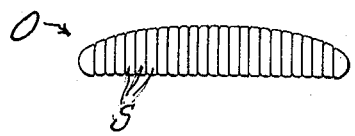
INVENTOR.
BY
ATTORNEY.

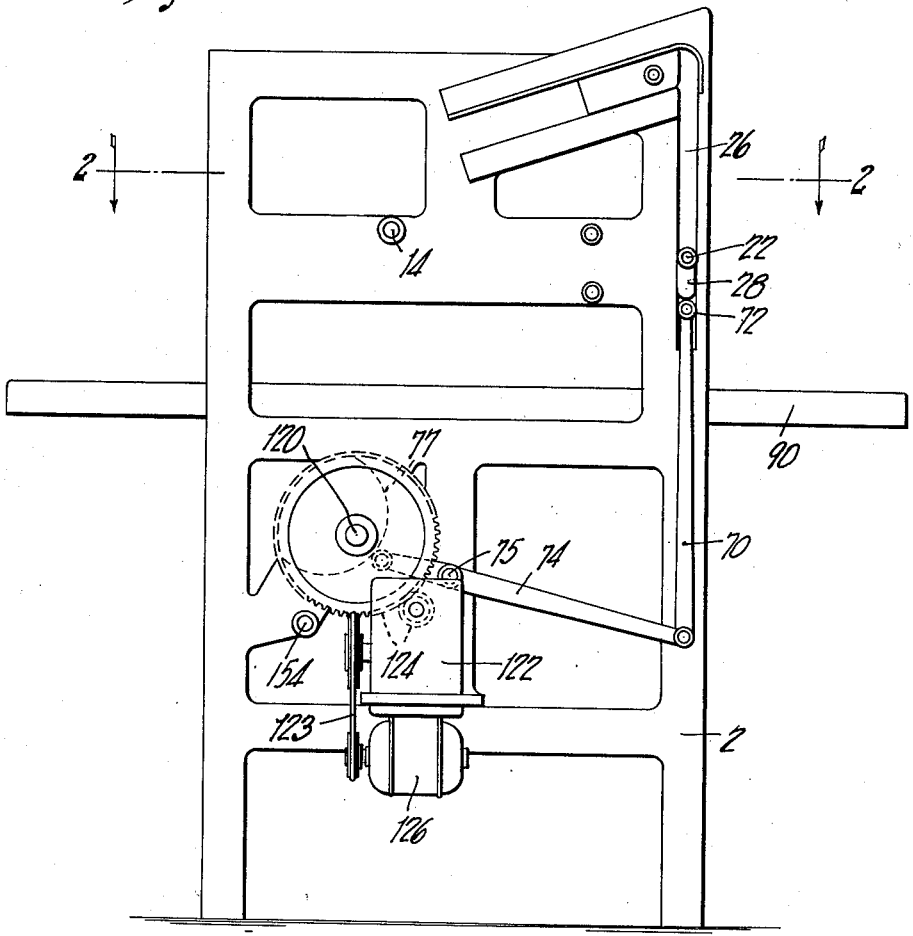

May 15, 1934.   J. L. PERKINS ET AL   1,959,303
DOUGH SLICING APPARATUS
Filed April 24, 1933   4 Sheets-Sheet 3
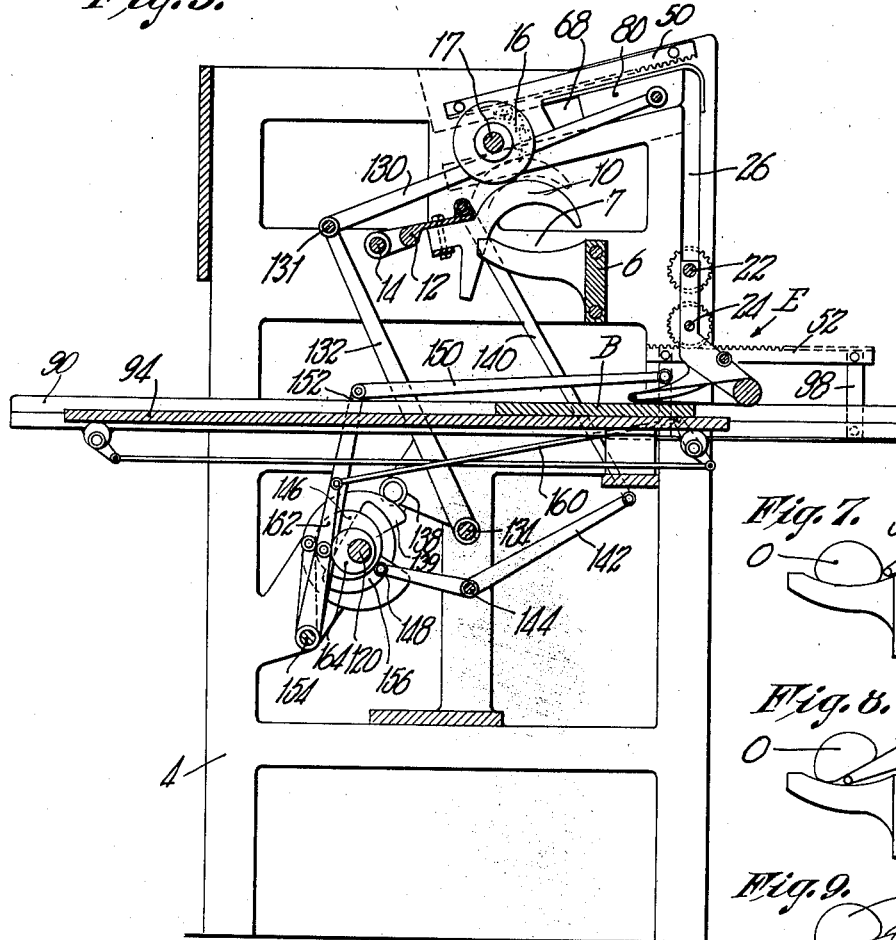
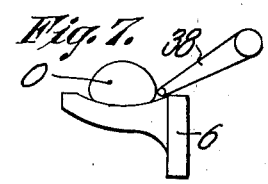
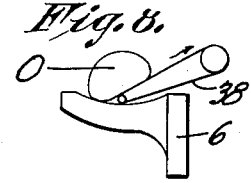
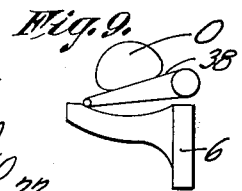
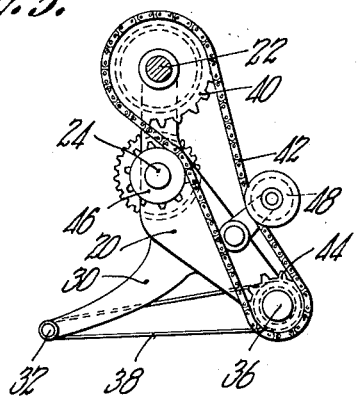
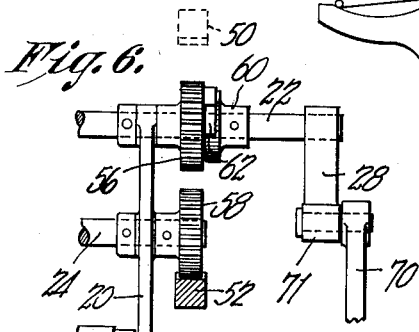

May 15, 1934.  J. L. PERKINS ET AL  1,959,303
DOUGH SLICING APPARATUS
Filed April 24, 1933  4 Sheets-Sheet 4

INVENTOR.
Julian L. Perkins,
BY Hiram D. Croft &
Louis E. Ologhia
Walter C. Ross
their ATTORNEY.

Patented May 15, 1934

1,959,303

UNITED STATES PATENT OFFICE 1,959,303

DOUGH SLICING APPARATUS

Julian L. Perkins, West Springfield, Hiram D. Croft, Springfield, and Louis E. Deleghia, Agawam, Mass., assignors to Perkins Machine & Gear Company, West Springfield, Mass., a corporation of Massachusetts Application April 24, 1933, Serial No. 667,673

16 Claims. (Cl. 107—21)

This invention relates to improvements in machines for slicing objects and is directed more particularly to improvements in machines for dividing a body of relatively soft material such as a loaf of unbaked dough into slices.

One object of the invention is the provision of a machine of the class described wherein a relatively movable object-supporting member and cutting knives have associated therewith means for lubricating and cleaning the knives.

Another object of the invention is the provision of means for removing a sliced object from a supporting table where it is sliced onto other means to facilitate the ready and easy removal of the sliced objects from the machine. Various other novel objects and advantages will now be described, reference being had to the accompanying drawings, wherein:

Fig. 1 is a side elevational view of a machine embodying the novel features of the invention.

Fig. 2 is a sectional plan view on the line 2—2 of Fig. 1.

Fig. 3 is a longitudinal elevational sectional view through the machine shown in Fig. 1.

Fig. 5 is a side elevational view of certain of the parts constituting the transporting mechanism.

Fig. 6 is a front elevational view of the parts shown in Fig. 5.

Figs. 7, 8 and 9 are diagrammatic elevational views showing the object supporting platform and transporter in different relative positions.

Fig. 11 is a side elevational view of an object such as a loaf of unbaked dough which has been divided into slices by means of the machine of the invention.

Figure 4:
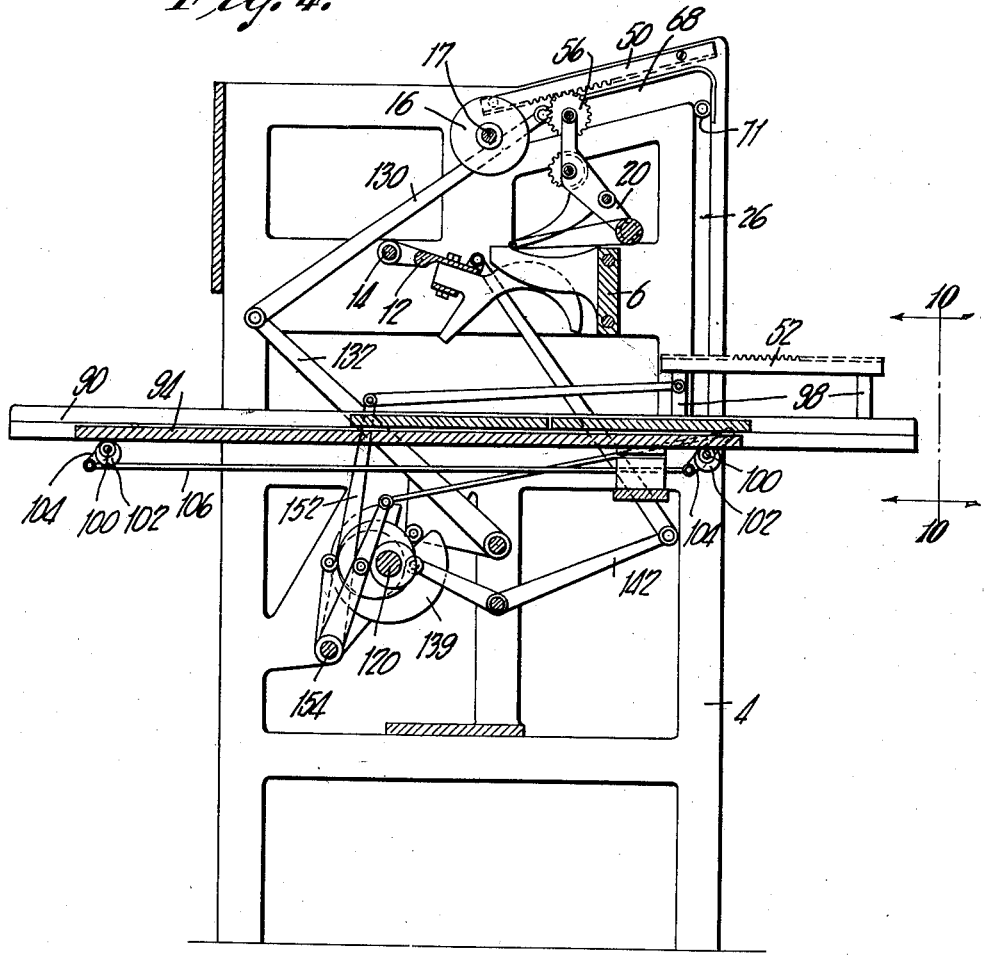
Fig. 4 is a view similar to Fig. 3 with certain of the parts in a different position.

Referring now to the drawings more in detail the invention will be more fully described.

Side frames 2 and 4 are arranged in spaced relation and may take any form desired in order to suitably support the various mechanisms of the machine.

A table or platform 6 for supporting an object such as a loaf of unbaked dough extends between the frames and it has an upper curved side 7 for suitably supporting such an object. The support is provided with vertically disposed spaced slots 8 for receiving cutter knives 10 which are arranged in spaced relation and carried by a knife bar 12. These knives are preferably curved as shown.

The cutter device is suitably pivoted as on a shaft 14 and is moved between an upper position shown in dotted lines in Fig. 3 and a lower position such as shown in Fig. 4. The cutter device may be rotated throughout a complete circle or may be oscillated back and forth between the positions referred to.

A plurality of cleaning and lubricating members 16 are mounted above the table 7. These may consist of a plurality of discs of felt or of some suitable material for holding lubricant or these members 16 may consist of brushes which are rotatable on or with a shaft 17. It is intended that as the knives arrive at a position above the platform that they be engaged by the members 16 so that the knives are supplied with the lubricant and at the same time cleaned to free them from particles of dough or the like.

In operation an article to be cut such as a loaf of unbaked dough is placed on the support 6 and the knives 10 are moved downwardly so as to pass therethrough and sever the dough into a number of units or slices as shown in Fig. 11.

When the knives have passed through the object and are in a position below the table as shown in Fig. 4 it is desirable to remove the object from the table. This is accomplished by means of the following.

An elevator indicated generally by E includes side brackets 20 in which are rotatable transverse upper and lower shafts 22 and 24. The upper shaft 22 extends beyond the members 20 into a vertically disposed slot 26 in the forward sides of the side frames. Dogs, such as 28, are carried on opposite ends of the shaft 22 and are guided in the slots 26. These dogs are acted upon by means later to be described.

Arms 30 extending forwardly from the members 20 have a shaft or roll member 32 in the forward ends thereof. A roll 34 is journalled by trunnion 36 in the lower ends of the members 20. A continuous belt preferably of flexible material such as fabric 38 is supported and operated by the rolls 34 and 32.

A gear 40 carried by shaft 22 is in engagement with the chain 42 which passes over a sprocket 46 on shaft 24 and a sprocket 44 associated with roll 34 and its trunnion. An idler is provided to take up slack in the chain. The elevator or transporter just described is moved up and down as will later appear.

A rack 50 is provided at the upper end of one of the side frames or there may be one associated with each end. A lower rack 52 is disposed as shown in Fig. 3 or there may, of course, be more than one rack. A gear 56 is rotatable on upper shaft 22 and a lower gear 58 is fixed on shaft 24. A ratchet wheel 60 is fixed to the upper shaft 22 which is engaged by a pawl 62 associated with the gear 56. The parts 56, 60 and 62 are so arranged that the ratchet 60 will be engaged by the pawl 62 as the gear 56 rotates in one direction so as to rotate shaft 22 while when the gear 56 rotates in an opposite direction the shaft 22 is not rotated. Slots 68 are provided in the side frames 2 and 4 and are disposed substantially parallel to the rack or racks 50.

Levers 70 outside the side frames (see Fig. 1) have upper rolls 72 slidable in the slots 26. Rocking levers 74 are pivoted at 75 are oscillated by a cam or cams 77 so that the upper ends of lever 70 are moved up and down to raise the elevator. The rolls or upper ends of the levers 70 lie just below the dogs 28 of the transporter and as the levers 70 move upwardly the elevator is moved upwardly thereby so that the dogs 28 are in alignment with the upper slots 68. Guides 80 are slidable in the slot 68 and at the time the elevator reaches its upper position these are movable rearwardly to allow the dogs 28 to travel along the slot 68 whereby the elevator moves inwardly to object-receiving position.

As the elevator reaches its uppermost position and before it slides into the slots 68, the forward end of the belt 38 assumes the position shown in Fig. 7. As the elevator moves inwardly along the slots 68, the belt or apron 38 passes under the object such as O on the platform. While moving forwardly from the position shown in Fig. 7 to the position shown in Fig. 9 the belt is moved in the direction of the arrow shown in Fig. 8. This causes the object such as a sliced loaf of dough to be removed from the platform so that the object is supported entirely by the belt. The belt is moved by rotation of roll 34 of the transporter, the gear 56 engaging rack 50.

The members 80 are moved after the object is taken on the belt upwardly or to the right in the slots 68 so as to move the dogs of the elevator or transporter back into the vertical slots 26. The levers 72 are moved so that the elevator descends to the position shown in Fig. 3.

As the elevator or transporter approaches this lower position the gear 58 thereof engages the rack 52. The rack 52 is movable back and forth and with the elevator in its lower position it is moved to rotate the gear 58 and thereby roll 34 so as to move the belt in an opposite direction whereupon the object supported by the belt is delivered onto a receiving member such as a board B.

From the foregoing it will be observed that an object such as an unbaked loaf of dough may be placed on the platform and that the cutter knives are oscillated or rotated to pass therethrough and slice or sever the same into a number of separate units. After the cutting operation the elevator advances forwardly so that the belt or apron thereof passes beneath the object and removes it from the platform so that it is supported by the apron and then the elevator descends and the sliced object is delivered by the elevator onto such means as a board indicated by B.

The board B may represent such a board as may be put into a proofing box or the part B may represent the bottom wall of a proofing box. It is desired according to one feature of the invention that the board or boards B be moved along step by step so that successive sliced loaves of dough may be deposited thereon. This is accomplished in the following manner.

Figure 10:
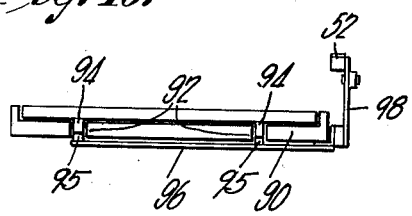
Fig. 10 is an end elevational view of certain of the parts taken on the line 10—10 of Fig. 4.

A bed extends horizontally between the side frame 2 and 4 and it has one or more slots such as 92 (see Fig. 10) in which are reciprocable bars 94. Prongs 95 are associated with a plate member 96 which is carried by brackets 98 associated with the lower rack 52. The rack is slidable in the adjacent side frame and relative to the bed and as it moves forwardly it moves the bars 94 forwardly.

Shafts 100 are rotatable below the bed 90 and carry eccentric members 102. Levers 104 and 106 associated with the shaft 100 are connected by a rod 106. The shafts are oscillatable so as to carry the eccentrics into engagement with the bars 94. The parts are so arranged that when the bars 94 are moved forwardly by a movement of the rack 52 the eccentrics elevate the bars into engagement with the board or boards B wherefor the boards are fed along simultaneously with the rack. When the rack returns to its rearward or outer position the eccentrics are in a lower position so that the bars move to the right or rearwardly without moving the board.

In this way the boards are moved forwardly in a step-by-step manner, accordingly as the rack is moved forwardly and in that way the boards are positioned to receive successive sliced loaves of dough.

The various parts may be operated by means of various mechanisms but the following will explain one way of operating the parts in the proper and desired timed relation.

A main drive shaft 120 may be driven from any suitable source of power as from a gear box 122, geared thereto by gears 124 which in turn is driven from a motor 126 by means of a belt 123.

Members 80 are connected by links 130 to the upper ends of levers 132 pivoted to the side frames or oscillatable on a shaft 134. A cam 139 engages a roll 138 of the lever 132. The lever is rocked back and forth by the cam.

Links 140 are connected to the bar 12 of the knife mechanism and their lower ends are pivotally connected to rocking levers 142 fixed to a shaft 144. A cam 146 contacts with an end 148 of one lever 142 and by this means the knife structure is operated. A link 150 connects the rack 52 to the upper end of a lever 152 which is oscillatable on a shaft 154 and a cam 156 is in contact with the lever 152.

A link or rod 160 is connected to one of the levers 104 and to the upper end of a rocking lever 162 oscillatable on shaft 154 and this lever is actuated by a cam 164.

Various changes and modifications may be made in the form of the invention and therefore what I desire to claim and secure by Letters Patent of the United States is:

1. A machine for slicing an unbaked loaf of dough into units comprising in combination, a relatively movable object support and cutter device, the said support being slotted and the cutter device including a plurality of spaced knives receivable in the slots of said support, a lubricating and cleaning device for engaging said knives and a transporter for transferring an object from said support to a receiver therefor after a cutting operation.

2. A machine for slicing an unbaked loaf of dough into units comprising in combination, a relatively movable object support and cutter device, the said support being slotted and the cutter device including a plurality of spaced knives receivable in the slots of said support, a lubricating and cleaning device for engaging said knives and a transporter for transferring an object from said support to a receiver therefor after a cutting operation, the said transporter including a member movable to pass beneath an object on said support and remove the same from the support.

3. A machine for slicing an unbaked loaf of dough into units comprising in combination, a relatively movable object support and cutter device, the former being provided with spaced slots and the latter including spaced cutters receivable in said slots, a transporter movable between a position adjacent said support and a discharge position including a belt adapted to pass beneath an object on said support to remove the same therefrom, means to operate said belt and means to move said transporter between object receiving and discharging positions.

4. A machine for slicing an unbaked loaf of dough into units comprising in combination, a relatively movable object support and cutter device, the former being provided with spaced slots and the latter including spaced cutters receivable in said slots, a transporter movable between a position adjacent said support and a discharge position, a movable belt associated with said transporter so that it passes beneath an object on said support to remove the object therefrom and means for moving said transporter and belt.

5. A machine for slicing an unbaked loaf of dough into units comprising in combination, an object support having slots therein, a plurality of knives receivable in said slots, a transporter including a movable belt adapted to pass beneath an object on said support and remove the same therefrom, means to move said transporter between a receiving position adjacent said support and a discharge position and means to receive objects from said transporter.

6. A machine for slicing an unbaked loaf of dough into units comprising in combination, an object support having slots therein, a plurality of knives receivable in said slots, a transporter including a movable belt adapted to pass beneath an object on said support and remove the same therefrom, means to move said transporter between receiving position adjacent said support and a discharge position and receiving means to receive objects from said transporter, the said means to receive the objects including a movable member and means to move the same so that it may receive successive objects.

7. A machine for slicing an unbaked loaf of dough into units comprising in combination, a relatively movable slotted object support and cutter device including a plurality of knives receivable in said slots, a transporter movable between upper and lower object receiving and discharging positions, a movable object supporting member associated with said transporter adapted when the transporter is in receiving position to remove an object from said support, means to actuate said object supporting member as the transporter approaches its receiving position and means to move said transporter.

8. A machine for slicing an unbaked loaf of dough into units comprising in combination, a relatively movable slotted object support and cutter device including a plurality of knives receivable in said slots, a transporter movable between upper and lower object receiving and discharging positions, a movable object supporting member associated with said transporter adapted when the transporter is in receiving position to remove an object from said support, means to actuate said object supporting member as the transporter approaches its receiving position and means to move said transporter, and a receiver to receive objects from said transporter.

9. A machine for slicing an unbaked loaf of dough into units comprising in combination, a relatively movable slotted object support and cutter device including a plurality of knives receivable in said slots, a transporter movable between an upper and lower object receiving and discharging positions, a movable object supporting member associated with said transporter adapted when the transporter is in receiving position to remove an object from said support, means to actuate said object supporting member as the transporter approaches its receiving position and means to move said transporter, and a receiver movable to receive successive objects from said transporter and means to move the same in a step-by-step manner.

10. A machine for slicing an unbaked loaf of dough into units comprising in combination, a relatively movable slotted object support and cutter device including a plurality of knives receivable in said slots, a transporter movable between upper and lower object receiving and discharging positions, a movable object supporting member associated with said transporter adapted when the transporter is in receiving position to remove an object from said support, means to actuate said object supporting member as the transporter approaches its receiving position and means to move said transporter, the said object supporting member of the transporter including an endless belt supported on spaced members to provide an upper object supporting run.

11. A machine for slicing an unbaked loaf of dough into units comprising in combination, a relatively movable slotted object support and cutter device including a plurality of knives receivable in said slots, a transporter movable between upper and lower object receiving and discharging positions, a movable object supporting member associated with said transporter adapted when the transporter is in receiving position to remove an object from said support, means to actuate said object supporting member as the transporter approaches its receiving position and means to move said transporter, the said object supporting member of the transporter including an endless belt supported on spaced members to provide an upper run, and the said actuating means therefor including mechanism for rotating one of said spaced members.

12. A machine for slicing an unbaked loaf of dough into units comprising in combination, a relatively movable slotted object support and cutter device including a plurality of knives receivable in said slots, a transporter movable between upper and lower object receiving and discharging positions, a movable object supporting member associated with said transporter adapted when the transporter is in receiving position to remove an object from said support, means to actuate said object supporting member as the transporter approaches its receiving position and means to move said transporter, the said object supporting member of the transporter including an endless belt supported on spaced members to provide an upper run, and the said actuating means therefor including mechanism for rotating one of said spaced members and means to actuate said member when the transporter is in discharge position.

13. A machine for slicing an unbaked loaf of dough into units comprising in combination, a relatively movable slotted object support and cutter device including a plurality of spaced knives receivable in the slots of the support, a transporter movable between upper receiving and lower discharging positions, a belt mounted on spaced members of said transporter adapted to remove an object from said support, means for moving said transporter, means for moving one of said members when the transporter is in either a receiving or discharging position.

14. A machine for slicing an unbaked loaf of dough comprising in combination, a relatively movable object support and cutter device, the former being provided with spaced slots and the latter including spaced cutters receivable in said slots, a transporter movable between a receiving position adjacent said support and a discharge position, means to receive a sliced loaf of dough and means for actuating said transporter between receiving and discharge position.

15. A machine for slicing an unbaked loaf of dough comprising in combination, a relatively movable object support and cutter device, the former being provided with spaced slots and the latter including spaced cutters receivable in said slots, a transporter movable between a receiving position adjacent said support and a discharge portion, means to receive a sliced loaf of dough and means for actuating said transporter between receiving and discharge position, the said transporter including means adapted to remove a sliced loaf of dough from said object support.

16. A machine for slicing an unbaked loaf of dough into units comprising in combination, a relatively movable object support and a cutter device including a plurality of spaced knives receivable in the slots of the support, a transporter movable between receiving and discharging positions, a movable object supporting member on said transporter adapted to remove an object from said object support, means to move said member when in receiving position and means to move said member when in discharge position.

JULIAN L. PERKINS.
HIRAM D. CROFT.
LOUIS E. DELOGHIA.